Feb. 24, 1959
J. LONG
2,875,318
MACHINE
Filed July 29, 1955
9 Sheets-Sheet 3
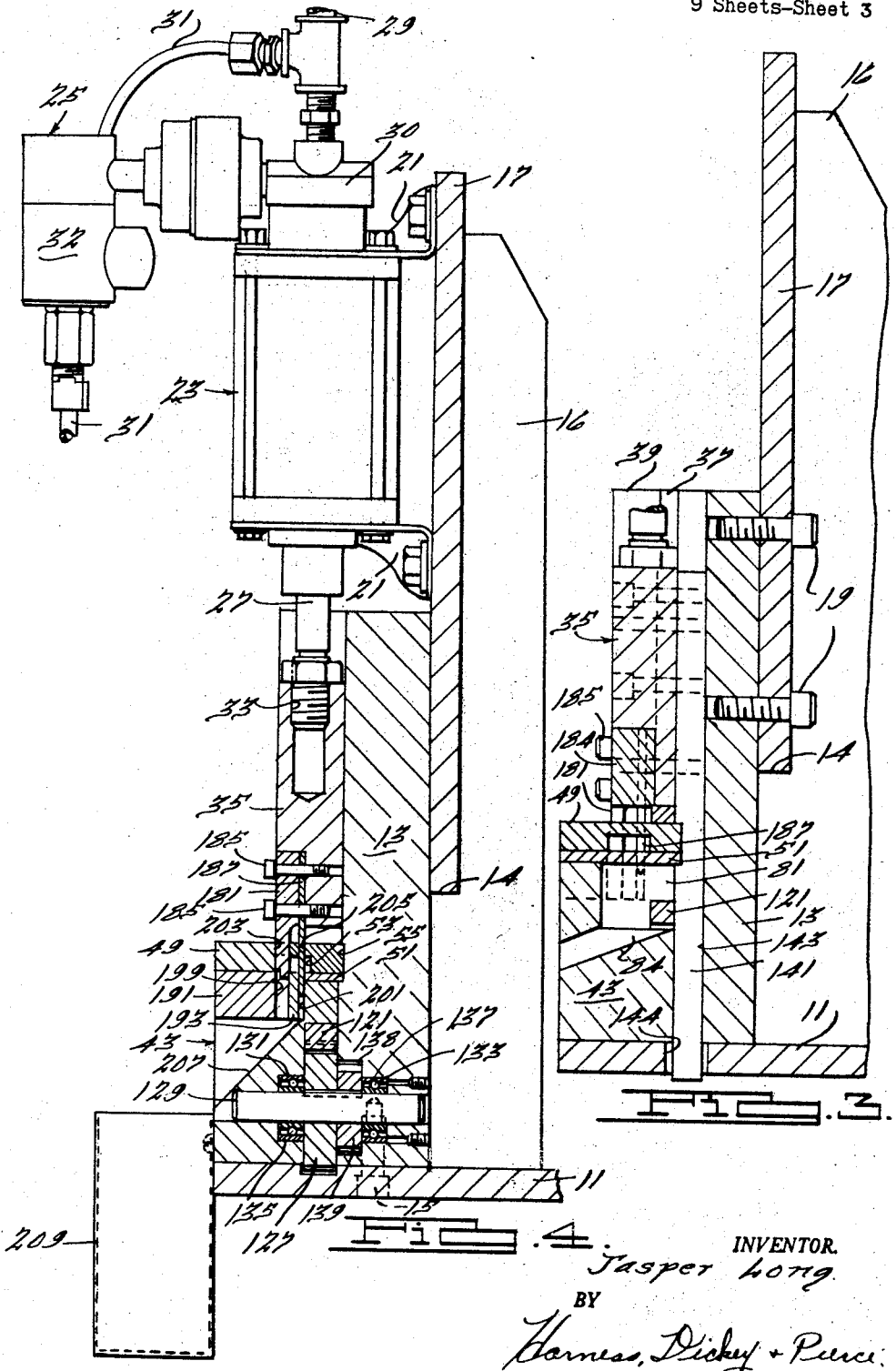
INVENTOR.
Jasper Long.
BY
Harness, Dickey & Pierce
ATTORNEYS

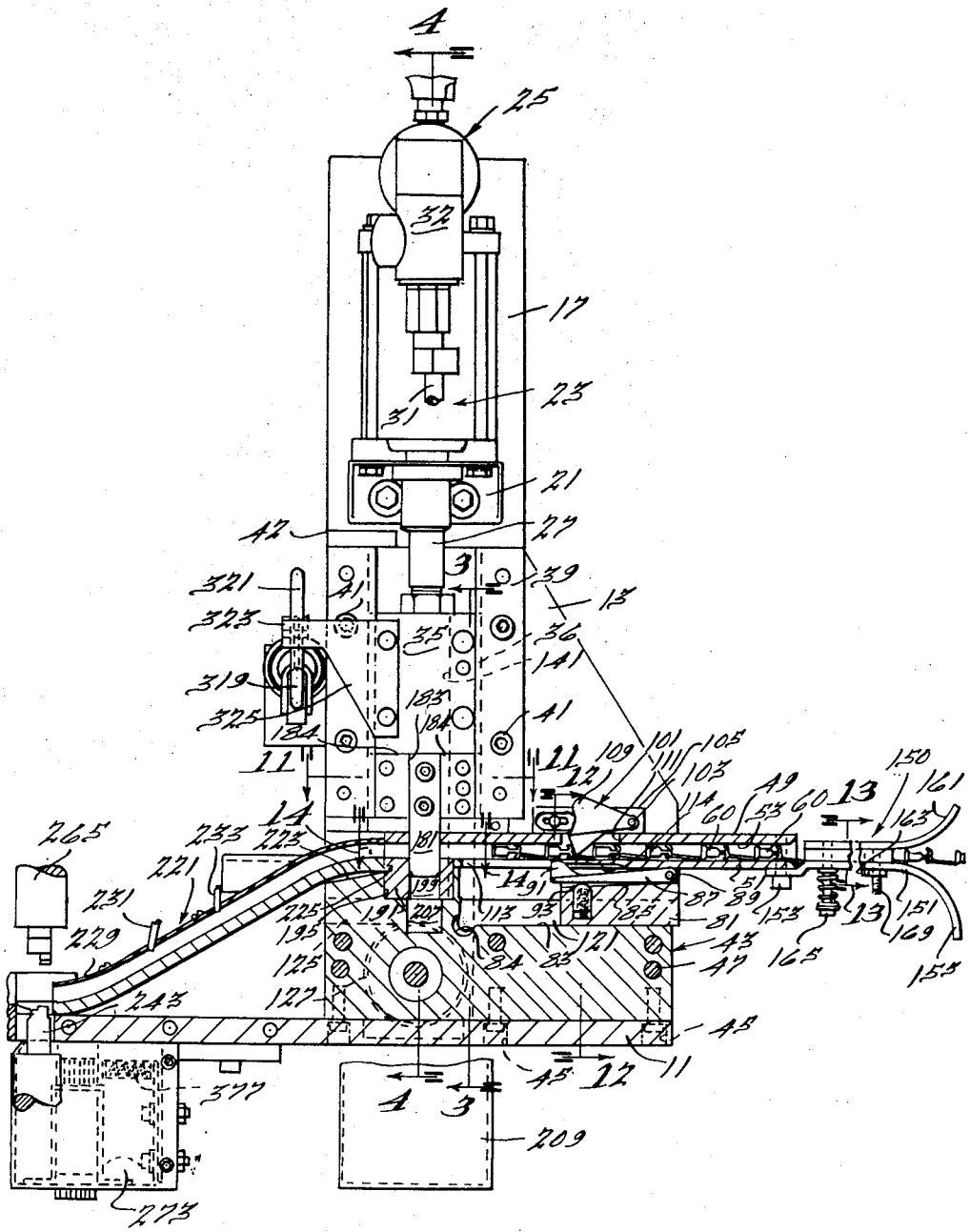

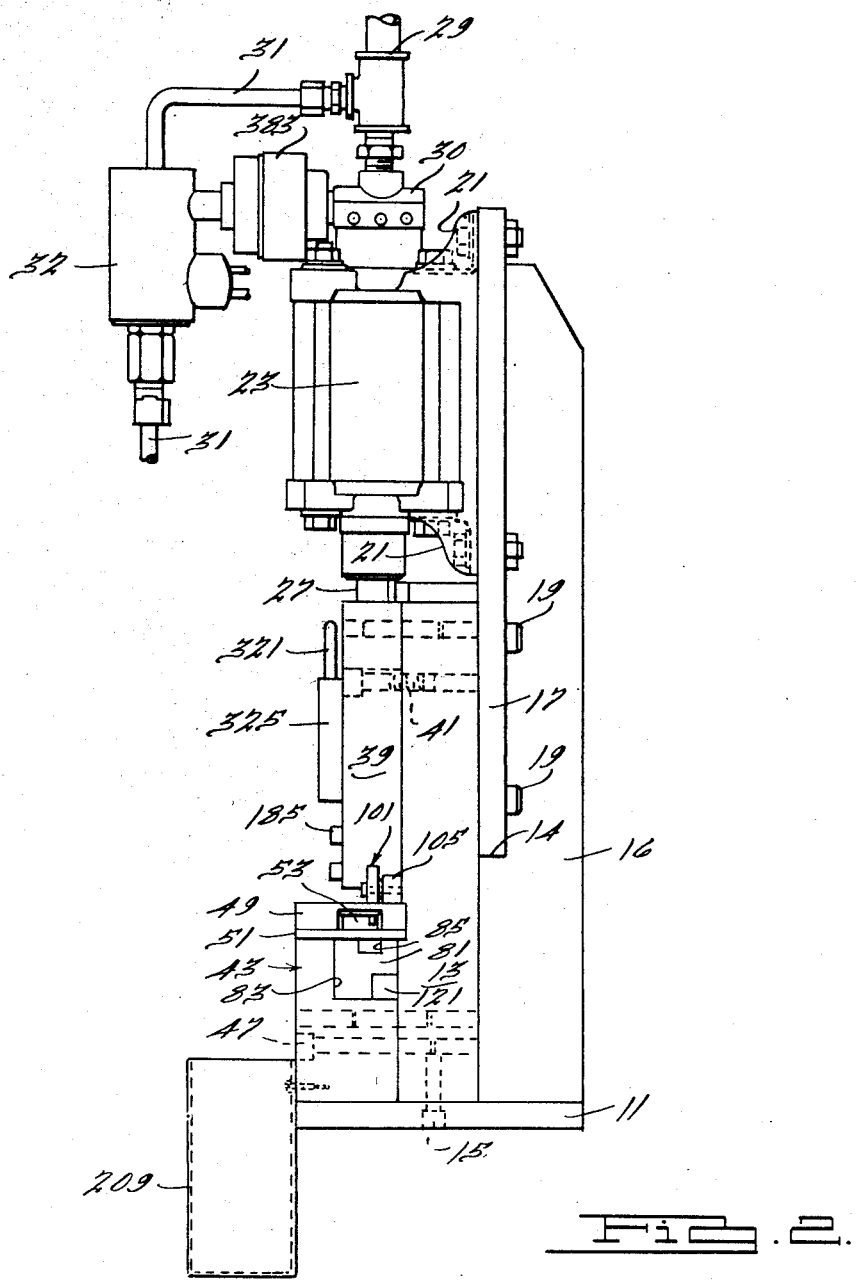

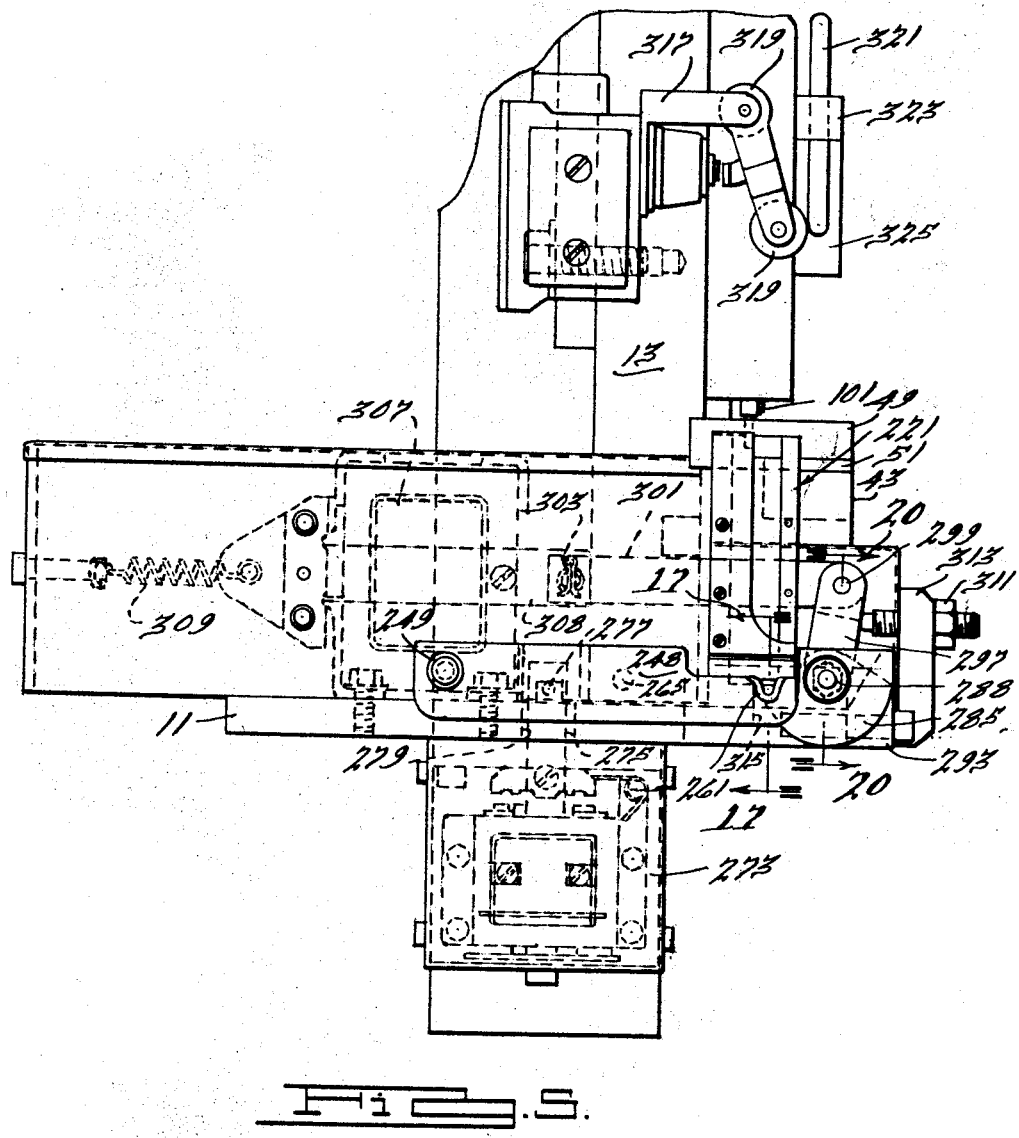

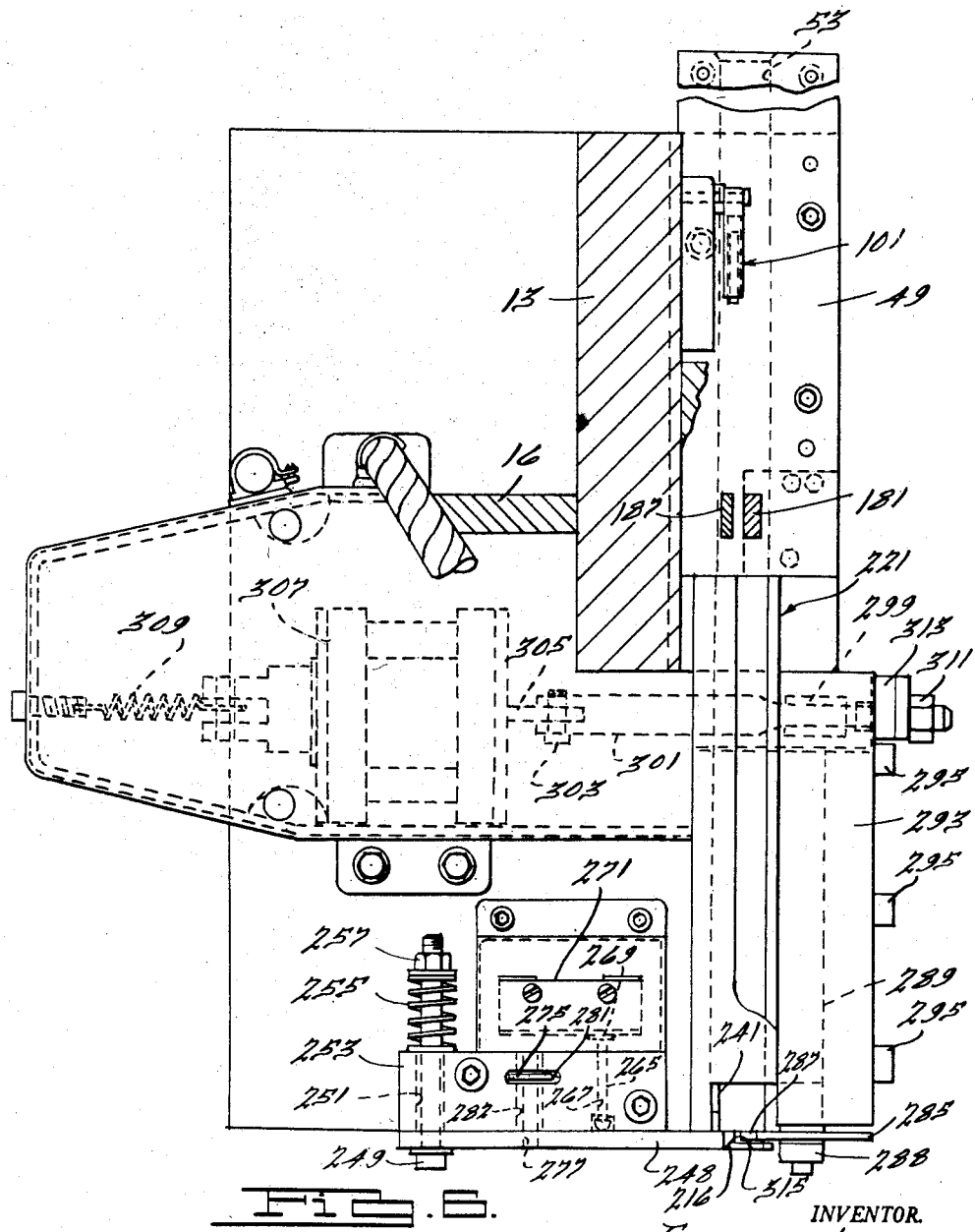

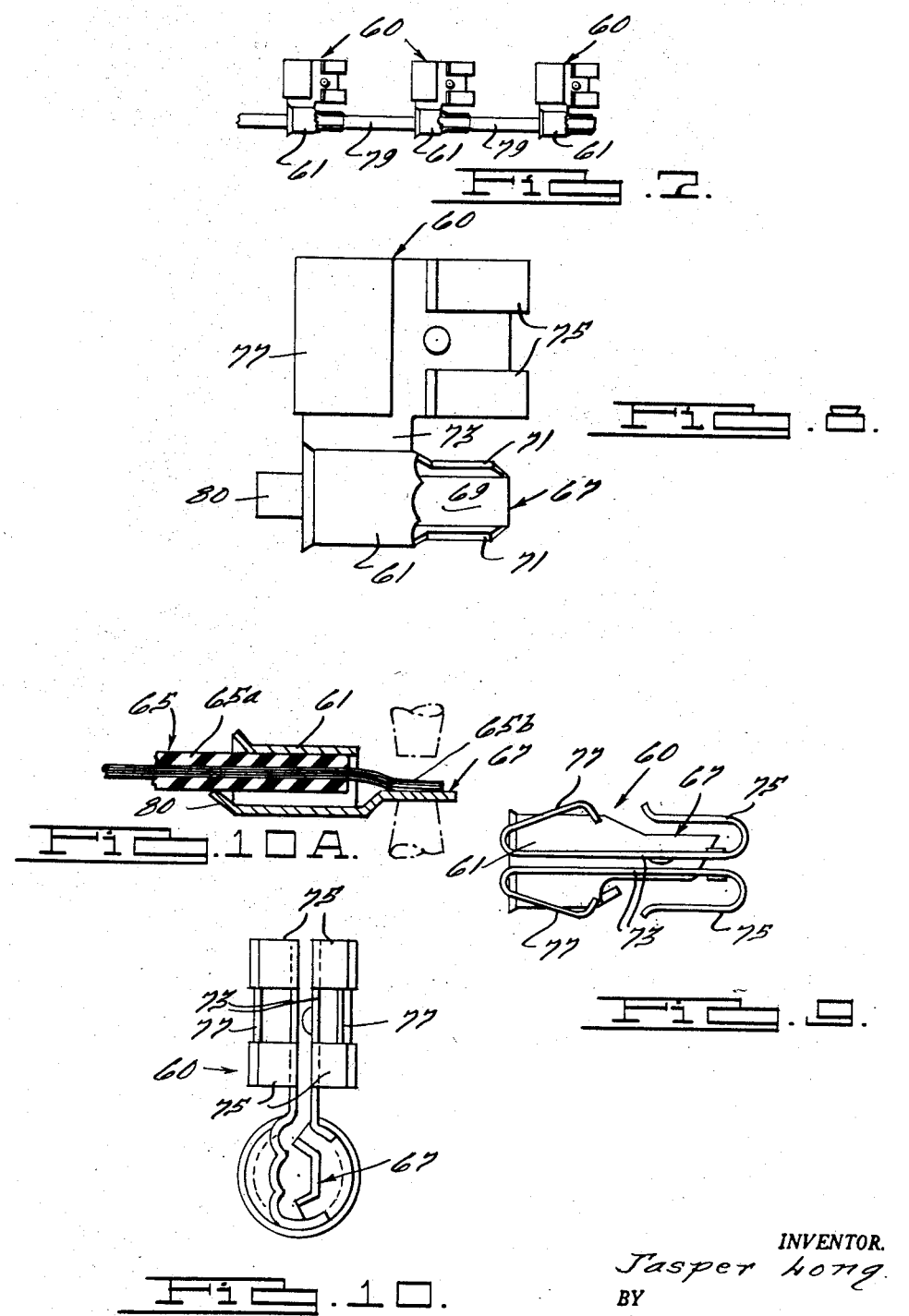

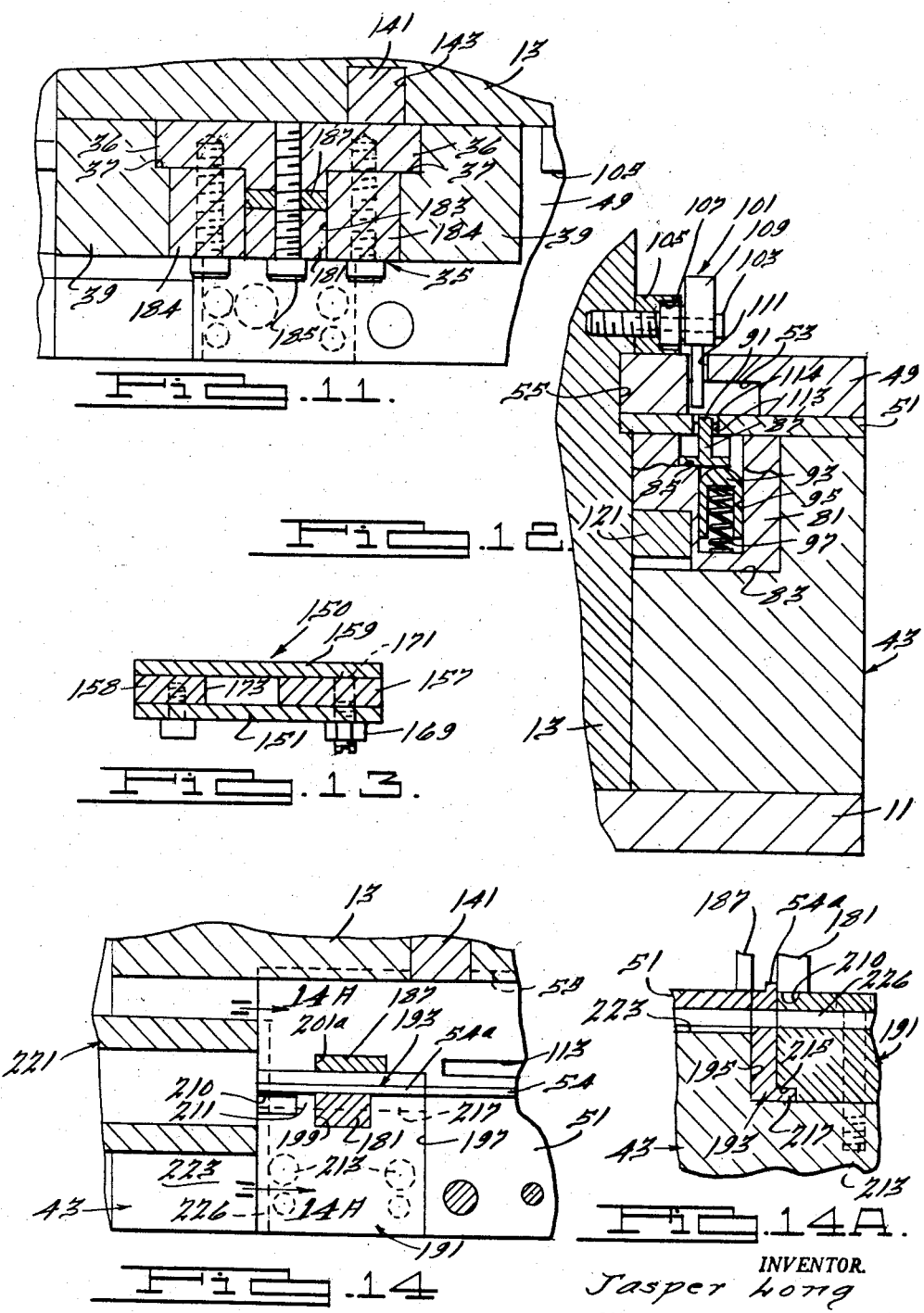

Feb. 24, 1959   J. LONG   2,875,318
MACHINE
Filed July 29, 1955   9 Sheets-Sheet 8
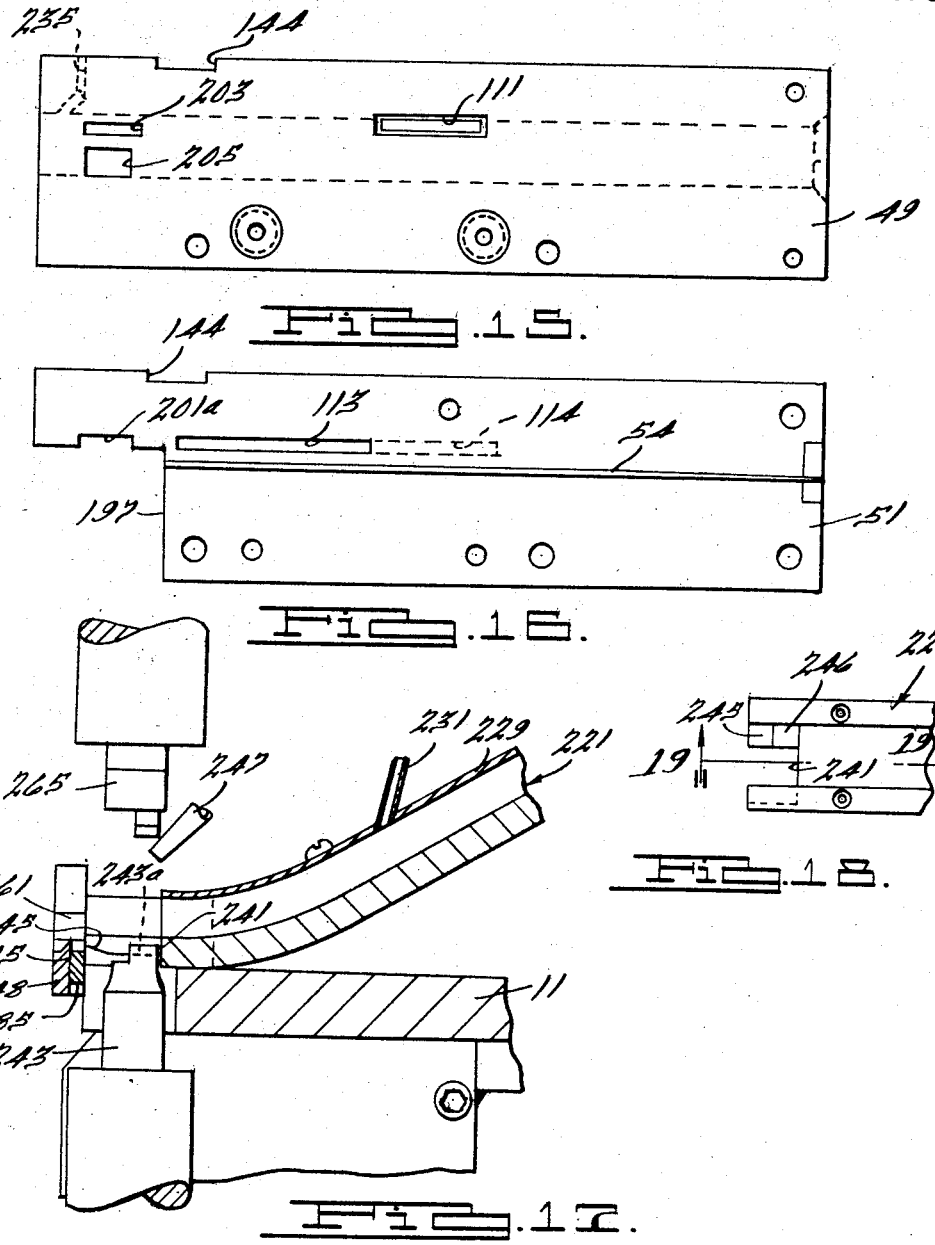
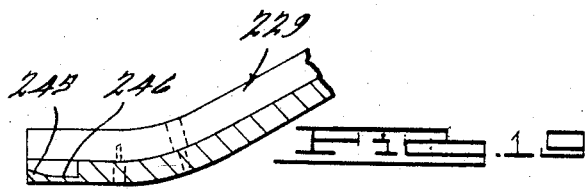
INVENTOR.
Jasper Long.
BY
Harness, Dickey & Pierce
ATTORNEYS.

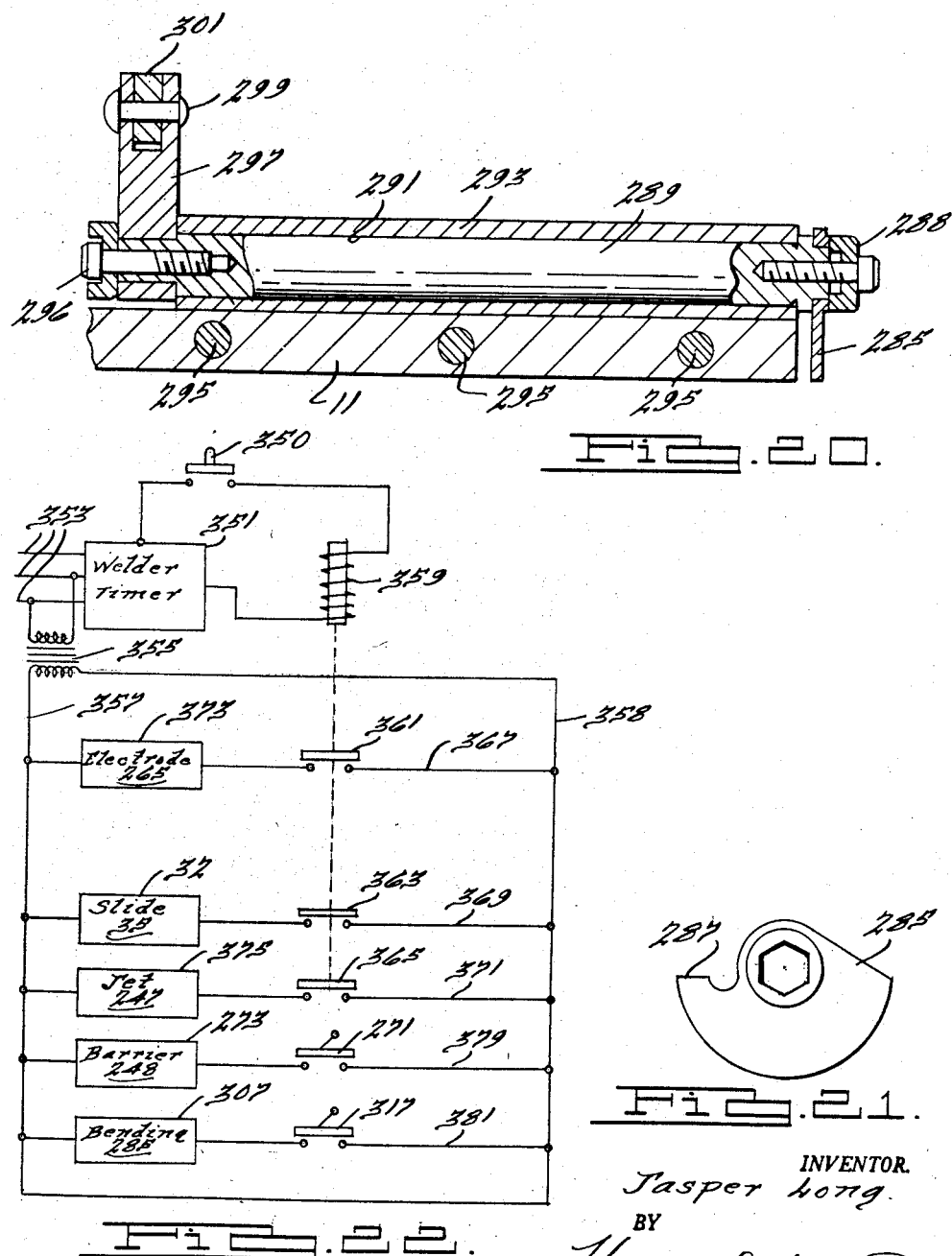

United States Patent Office 2,875,318
Patented Feb. 24, 1959

2,875,318

MACHINE

Jasper Long, Sturgis, Mich., assignor to Wade Electric Products Co., Sturgis, Mich., a corporation of Michigan Application July 29, 1955, Serial No. 525,320

4 Claims. (Cl. 219—79)

My invention relates to apparatus for severing individual parts from a strip of such parts and subsequently welding a wire to the severed part. The present application is a continuation-in-part of my copending cases, Serial Nos. 69,806 and 498,211, filed January 7, 1949, and March 31, 1955, respectively.

In the first filed of my aforementioned copending applications I have disclosed the idea of welding electrical conductors or lead wires to metal contacts or terminals that have been formed by a progressive die in a long strip of metal and severing the contact from the strip. In the other of my copending applications I have disclosed apparatus which is designed particularly to take reels or spools of terminals in strip form, which have previously been shaped in a progressive die, and then welding a lead wire to such terminals, staking the terminal to the wire, and then severing the terminal from the strip.

In certain cases I have found it advantageous to use the apparatus of the present invention rather than that disclosed in my previous cases, particularly when the structure of the terminal or contact element is relatively complex and awkward to handle or the assemblies involve considerable lengths or awkward positions of the lead wires. According to my present invention I feed the terminal elements in strip form to a station which severs them one by one from the strip. Each severed terminal is transferred to a welding station at which point the lead wire is welded to it. During a cycle of the machine one terminal will be severed from the strip and another terminal will be spot welded to the lead wire. I also incorporate means at the welding station to stake the wire to the terminal. My present invention includes mechanical means for feeding the strip of terminals to the cutoff station and preferably gravity and air pressure means for feeding the severed terminal from the cutoff station to the welding station. I prefer to space the welding station a significant distance from the cutoff station since I have found that this simplifies the construction of the apparatus and makes it possible to use a maximum number of standard items that may be purchased on the open market. Furthermore, it gives the operator more room in which to work and has an important psychological advantage in making the operator feel that she has good control over the apparatus and nothing to fear from its operation. Separating the welding station from the cutoff station also minimizes the effects of eddy currents and simplifies maintenance problems which are substantially different for the structures at the two stations. Operation of the two stations, however, is coordinated so that each is dependent upon the other and operates in a predetermined relationship to the other.

My present invention will be described in a preferred form in the accompanying drawings but it will be appreciated that it is capable of handling a wide variety of parts fed to it in strip form and that several of the structural details shown herein are peculiar to the parts upon which this particular machine is to operate and that when the machine is used on other parts, slightly modified features of construction will have to be used. The figures of the drawings are described as follows:

Figure 1 is a front elevation of the present apparatus with parts in section and parts broken away;

Fig. 2 is a side elevation taken from the right of Fig. 1 with the drag apparatus 150 removed and with parts of the control apparatus broken away;

Fig. 3 is a section along the line 3—3 of Fig. 1;

Fig. 4 is a section taken along the line 4—4 of Fig. 1;

Fig. 5 is a side elevation partly broken away taken from the left of Fig. 1, the welding apparatus being removed in this and other figures since it is standard apparatus that may be purchased on the open market and which is described in more detail in the second of my copending applications;

Fig. 6 is a plan view of the apparatus with a part of the cutoff apparatus shown in section;

Fig. 7 is a plan view of a strip of contact elements to be handled by the present apparatus;

Fig. 8 is an enlarged view of one of the contact elements after it has been severed from the strip;

Fig. 9 is a side elevation taken from the top of the contact element in Fig. 8;

Fig. 10 is a side elevation taken from the right of Fig. 8;

Fig. 10A is a section through the wire receiving portion of the contact element and showing the tab or staking ear for adapting the contact to various size wires;

Fig. 11 is a cross section through the cutoff slide taken along the line 11—11 of Fig. 1;

Fig. 12 is a section taken along the line 12—12 of Fig. 1 showing details of the feed mechanism;

Fig. 13 is a section taken along the line 13—13 of Fig. 1 showing details of the drag assembly;

Fig. 14 is a section taken along the line 14—14 of Fig. 1 showing the die elements and various apertures in the lower stripper;

Fig. 14A is a section taken along the line 14A—14A of Fig. 14, the end of the slide chute and certain other parts being omitted;

Fig. 15 is a plan view of the upper stripper;

Fig. 16 is a plan view of the lower stripper;

Fig. 17 is a section taken along the line 17—17 of Fig. 5 and shows the welding station;

Fig. 18 is a plan view of the end of the slide chute for transferring terminals from the cutoff station to the weld station;

Fig. 19 is a section along the line 19—19 of Fig. 18;

Fig. 20 is a section along the line 20—20 of Fig. 5 and shows mechanism for operating the staking element;

Fig. 21 is a front elevation of the staking element; and

Fig. 22 is a circuit diagram for the apparatus.

Referring first to the main structural framework of the improved machine which serves as means whereby the machine may be bolted or otherwise affixed in place to a suitable bench or other conventional supporting device (not shown), there is a horizontal bottom base plate 11. On top of the plate 11 is a vertically extending bracket 13 which is bolted to the base plate 11 by means of bolts 15 which fit in recessed openings in the bottom of the plate 11. Carried by the vertical bracket 13 and in a notch 14 of vertical rib 16 is a vertically extending mounting plate 17 that is secured by bolts 19 to the back of the bracket 13. The mounting plate 17 carries upper and lower brackets 21 which may be bolted or otherwise suitably affixed to the plate. Bolted to the brackets 21 is an air cylinder 23 and a solenoid operated control valve assembly 25 for the air cylinder. The cylinder and valve assembly are conventional elements that may be purchased upon the open market, the particular devices illustrated being sold by The Bellows Co. of Akron, Ohio as Model BSKM and described in their bulletin CL-50. The cylinder 23 has the vertically reciprocable piston and ram 27 depending from the bottom of the cylinder and it is this element which carries and operates the punch and cutoff elements to be later described. Pressure air to operate the cylinder 23 is fed to the valve assembly 25 through the tubing connection at the top of T 29 and is exhausted from the back of valve element 30, pilot air being taken off at 31 to operate valve element 32. The lower end of the ram rod 27 threads into an opening 33 in a slide 35 so that the slide will reciprocate with the plunger. The slide 35 is T-shaped in cross section (Fig. 11), that is it has lateral flanges 36 which will lie beneath inwardly facing shoulders provided by cut out corners 37 in the side rails or gibs 39, the gibs being bolted at 41 to the bracket 13. Stops 42 may be bolted to the face of bracket 13 to engage the top and bottom edges of the slide and define its uppermost and lowermost positions.

Also mounted on the base plate 11 is a block 43 which is roughly rectangular in cross section but which contains several openings and cutouts for parts to be presently described. The block 43 is secured to the base plate 11 by means of bolts 45 and secured to the side bracket 13 by means of bolts and dowels 47. On top of the block 43 are mounted an upper and a lower stripper plate 49 and 51 respectively, and which cooperate to define a guide track or opening 53 for the contact elements that are to be operated upon by the machine of this invention. The upper and the lower stripper may be bolted or otherwise suitably affixed to the block 43 and in addition the rear edges thereof are preferably received in a groove 55 that is cut out of the face of the bracket 13. The lower stripper may have a vertical rib 54 to assist in guiding the strip of terminals.

While the machine of this invention is capable of handling other types of devices, it is particularly intended for use with headlight contacts of the general type shown in Patents 2,296,632 and 2,307,812. If different types of contacts or devices are to be cut off and spot welded by means of this machine, certain rather simple changes can be made in it to adapt the machine to the new shape. Such changes will include replacement of the upper and lower stripper and the cutoff punch and die assembly as well as the specific welding tips that are used. The particular contacts 60 of the aforementioned patents are illustrated herein in Figs. 7 to 10 and comprise a bent-over piece of metal which, adjacent the corner of the bend, is shaped to form a tubular socket 61 for the insulated end 65a of a conductor wire 65. As a continuation of the tubular socket 61 there is an open topped weld pocket 67 with a bottom surface 69 and side edges 71. The weld pocket 67 receives the stripped or bared end 65b of the conductor wire which is ultimately spot welded to the bottom of the pocket in the machine of this invention. The upper and lower contact sections extending laterally from the tubular socket 61 are preferably identical and include confronting but spaced flat sections 73 (which slide on rib 54 of the lower stripper 51) which are adapted to engage opposite sides of a blade type terminal. At one side of the section 73 there are two rebent legs 75 and at the other side there is a single wide rebent leg 77, both legs serving as spring means to urge the surfaces 73 together when the contact is fitted in a suitable aperture in the connector that receives them. The contact elements 60 are fed to the machine of this invention in strip form. The strip is made in a progressive die (e. g. apparatus in the first of my copending cases) which takes ordinary flat blank stock and forms in it the contact elements that have just been described. However, connecting portions or carrier strips 79 between adjacent contact elements 60 are left so that the series of terminals 60 are connected together, the connecting strips 79 preferably being in alignment with the bottoms 69 of the weld pockets 67.

The contact strips may be wound up in reels or spools which are rotatably supported adjacent the machine so that the free end of the strip can be inserted into the inlet of recess 53. Apparatus to be described will pull the strip through the machine.

In order to feed the strip of contacts 60 through the machine there is provided a slide 81 which reciprocates in a slot 83 that is cut out of the block 43, the aperture 84 as the inside end of the slot 83 preventing a vacuum lock of the slide. The slide 81 has a groove 85 cut out of its top surface which is downwardly inclined a slight amount, and to opposite side walls of the groove 85 is pivoted a pawl 87 by the pin 89. The pawl 87 has a thin upstanding fin 91 and this is arranged to fit in the space between adjacent contacts 60 and between legs 75. The forward end of the fin 91 is square whereas the rear end is tapered as clearly seen in Fig. 1. Pawl 87 is urged to an upward and feeding position by a thimble 93 which fits in an opening 95 in the slide and which is pressed upwardly by a spring 97 in the opening. It can be seen that as the slide 81 is moved to the left the pawl 87 will engage behind a contact 60 to move the entire strip of contacts to the left. When the slide is moved to the right, the tapered rear or trailing edge of the pawl 87 will ride under the adjacent contact 60, depressing the spring 97 so that the pawl and the slide can be moved to a position from which it can be indexed back again to the left. In order to positively prevent backing up of the strip of contacts 60 as the slide is moved to the right, ratchet pawl 101 is pivoted by pin 103 to a block 105 that is secured to the face of bracket 13 by bolts working in slots 107 so that the longitudinal position of the ratchet can be adjusted. The ratchet pawl has a finger piece 109 whereby it can be readily lifted from its stopping position. Ratchet pawl 101 extends downwardly through an opening 111 in the upper stripper 49 and the driving pawl 87 works in a slot 113 in the lower stripper 51. It will be noted that the outer end of slot 113 is formed as a cam groove 114 which will cam the fin 91 of pawl 87 downwardly. Inasmuch as different stripper plates are required for different workpieces the slot 113 and groove 114 can be adjusted according to the spacing between adjacent workpieces in a strip to control the operating length of the stroke of pawl 87, the actual movement of slide 81 remaining constant.

The slide 81 is driven by a rack 121 which is bolted to the slide by sunken bolts (not shown). The rack 121 slides along the surface 83 and along the bottom of a slot 125 provided for it in the block 43. The teeth of the rack 121 are on the bottom face and mesh with teeth in a gear 127 that is keyed to a rotatable spindle 129 which is supported in bearings 131 and 133 that are seated in openings 135 in the block 43 which opens out of the back face thereof and 137 in the bracket 13 which opens into enlarged opening 138 in the front face of the bracket. Keyed on the spindle 129 next to the gear 125 is a smaller gear 139 in opening 138 which is the drive gear for the spindle 129. It in turn is driven by a vertical rack 141, bolted to the back of slide 35, that slides in a recess 143 cut out of the face of the bracket 13 and through slots 144 in the upper and lower strippers and the base plate 11. It will thus be seen that when the slide 35 is reciprocated, it will drive the rack 141 which in turn will drive the gears 139 and 127 that in turn drive the rack 121 and the slide 81 which carries feed pawl 87. When the slide 35 descends, this motion will be transmitted to the slide 81 so that it is driven to the right, that is to a recovery position from which it can upon the upstroke of the slide 35, index feed the strip of terminals or contacts 60 into the machine.

Before entering the recess 53 provided by the upper and lower strippers 49 and 51, the strip of contact elements passes through a drag assembly 150 which applies a certain amount of yieldable frictional resistance to the strip so as to prevent any undesired movement thereof.

This comprises a lower mounting plate or base 151 that is bolted at 153 to the lower stripper and which has the curved inlet edge 155 to guide the strip if it is offset from recess 53. Laterally spaced blocks 157 and 158 of less width than the base 151 are mounted on the base and on top of them is an upper plate 159 that has the curved inlet end 161. The block 157 is secured to the base 151 by bolts 163 and the top plate 159 is pivotally secured to both the block 157 and the plate 151 by a bolt 165 that pivotally extends through the block and lower plate and threads into the top plate 159, there being a spring confined between the head of the bolt and the bottom of the plate 151 to yieldably prevent lifting of the plate 159. A spring plunger type set screw assembly 169, that can be bought on the open market is mounted on the lower plate 151 and has a dog nose 171 that fits in a suitable recess in the bottom of plate 159 to act as a detent holding it in proper position. It also serves as a means to regulate the forces with which the plate is held on the blocks 157 and 158. The space 173 between the blocks 157 and 158 is in alignment with the track or recess 53 and the height of the space 173 is just enough less than the over-all height of the contacts 60 to impose a slight drag on the strip that will require an intentionally applied force to overcome it.

The contacts 60 are severed from the strip by a cutoff punch 181 that is bolted to the slide 35. The cutoff punch fits in a slot 183 that is formed between spaced guides bolted on blocks 184 and opens out of the front of the slide so that attachment bolts 185 are readily accessible. Behind the cut-off punch 181 is a locator element 187 that is also attached to the slide by bolts 185. The locator element fits between adjacent contacts 60 and within the turned-over legs 75 and is somewhat longer than the cutoff punch so that it will enter the strip and properly align it before it is contacted by the cutoff punch. The punch severs the carrying strip 79 between adjacent contacts 60 and may be of sufficient width to sever all of this strip or may be reduced in width so as to leave a staking ear or tab 80 at the end of the socket 61 for a purpose to be presently described.

The cutoff punch and the locator work in an assembly of die element 191 and die spacer 193 that fit in an opening 195 in the top of the block 43 and an opening 197 in the lower stripper 51. The die 191 provides opening 199 to receive and guide the cutoff punch 181 and the stripper has side cutout 201a aligned with an opening 201 in block 43 for the locator punch 187, the upper stripper having openings 203 and 205 for the passage of these elements. As can be seen in Fig. 4 the block 43 has a slanting cutout 207 formed in it beneath the opening 195 and communicating with openings 199 and 201. This permits free movement of both punches and also serves as a chute for the egress of scrap cut by the punch 181 from the strip. A receptacle 209 is removably secured to the front of the block 43 to receive scrap sliding down the chute 207. The spacer 193 has a rib 54 aligned with rib 54 of stripper 51 and the die 191 has a recess 210 in which tubular portion 61 of the contact 60 fits during cutoff so that the section 211 can provide a flat support surface for the bottom of pocket 67 and the connecting strip 79. Die 191 is bolted as at 213 to the block 43 and has a notched out bottom corner at 215 to receive a foot 217 on the spacer 193 whereby the latter is held firmly in place.

The severed contacts 60 that have been removed from the strip by the punch 181 are blown by air down a channel-shaped chute 221. At the bottom of the chute they are brought to rest and the wire is spot welded in the pocket 67. Also, if a tab 80 has been left by the cutoff punch 181 on the back of the socket, it will be bent up against an insulated portion of the wire while the contact is held by the electrodes. It may be noted here that the purpose of the tab is to adapt the socket to various size wires, the tab holding the wire firmly in place in the socket to prevent substantial deflection that might tend to rupture the wire or the weld. The weld apparatus is shown only fragmentarily herein as it is disclosed in more detail in the second of my copending cases and is available on the open market, e. g., from Taylor Winfield Company of Warren, Ohio, as Model No. EB 2-8-20.

The chute 221 is supported at its top end on the surface 223 cut out of the block 43 and it has a projecting ear 225 that fits in correspondingly shaped recesses 226 in the die block and die spacer 191 and 193 and the block 43, these serving to hold the chute in position. The bottom end of the chute is bolted to the base plate 11. In cross section the chute is shaped so that the contacts 60 will slide freely down it without twisting or turning and a sheet metal cover 229 may be placed over it if desired. A plurality of air jets located at an angle to the path of contacts moving down the chute may be spaced along the length thereof as shown at 231 and 233. These will act to speed passage of the contacts along the chute. The contact is moved into the chute in the first instance, after it has been severed, by pushing from the strip as it is indexed to bring the next successive contact in line with the cutoff punch. In addition to this, there is an air jet orifice 235 in the upper stripper which is angled to direct air down the chute and blow the contact out of the track 53 and down toward the electrodes. Some or all of the various air jets may be connected with a constant source of air pressure or their feed lines (not shown) may be connected at the back of valve 30 to be operated by exhaust air when the slide is lifted, the particular hookup required being determined by the results obtained with any particular type of workpiece 60. When properly set up, the contacts 60 will be driven very fast (like a shot) from the cutoff station to the weld station.

The bottom of the slide 221 is cut out at 241 to receive the fixed lower electrode 243 which engages the bottom of the weld pocket 67. There is the inclined surface 245 on which the opposite side of the contact 60 (leg 77) rests when the weld pocket is so positioned on the electrode. After the contact has passed down chute 229 it is properly located automatically, this being done in part by the surface 245. The tip of electrode 243 has a recess 243a in it shaped to receive pocket 67 and also to provide some support for socket 61. Thus the contact is supported on one side by the chute (surfaces 245 and 246) and on the other by the electrode 243. It is held against these surfaces by a jet of air 247 that is located at a suitable angle and which is operated only during the welding period. If the contacts 60 are formed so that there is no ear 80 projecting from the end of the tubular socket it can also be located by a movable barrier 248 which closes the end of the chute. This barrier is pivoted by pin 249 which extends through a laterally enlarged hole 251 in a block 253 and is held in shouldered position against the barrier by spring 255 confined between the back face of the block and a nut and washer assembly 257 threaded on the end of the pin. This type of pivot connection permits a certain amount of lateral and axial play with respect to the axis of the bolt 249 and is used to actuate a micro switch as will be hereinafter mentioned. The barrier 248 has a flared open sided cut out 261 formed in it which is in alignment with the wire socket 61 in the contact 60 when the latter is in position for welding on the lower electrode 243 as just described. The operator inserts the wire through the opening 261 into the contact and simultaneously trips a foot switch which sets the welder into operation, feeding down electrode 265, and initiates a complete cycle of the entire apparatus. After the welding operation has been completed and the upper electrode 265 automatically retracted, the operator will attempt to remove the welded wire and contact and in doing this will exert a slight pressure on the barrier 248. This will cause a slight movement of the barrier because of its floating pivot connection 249. This movement will ease pressure on a headed pin 265 that slides in aperture 267 in the block 253. This pin operates the contact 269 of a conventional micro switch 271 which is actuated or closed when the pin is out of contact with the element 269. The micro switch 271 controls flow of current to a conventional solenoid 273 which has its plunger 275 pinned at 277 to the barrier 248, slots 279 and 281 in the base 11 and the block 253 accepting the plunger 275 and a suitable slot 282 in block 253 permitting movement of pin 277. When the solenoid 273 is actuated the plunger 275 will be pulled down to pivot the barrier 248 downwardly and this removes it as the obstacle to removal of the contact 60 and wire assembly from the chute 221. The solenoid 273 holds briefly and then is released so that spring pressure forces the plunger 275 upwardly to return the barrier 248 to its blocking position.

When the ear 80 is left on the tubular socket 61 a punch 285 is inserted between the barrier 248 and the end of the chute to bend the ear upwardly into contact with the wire 65 upon tripping of the foot switch by the operator after the wire has been inserted in the socket. The bending element 285 is in the form of a pivoted sector having a bending surface 287 that underlines the ear 80 and bends it up when the sector is rotated in a clockwise direction as viewed in Figs. 5 and 21, the contact being firmly held between the upper and lower electrodes during such bending operation. The bending member 285 is affixed by suitable means 288 to a shaft 289 that is journalled in an aperture 291 in a block 293 that is bolted at 295 to the side of the base plate 11. At its other end the shaft 289 is affixed by suitable means 296 to the bottom of a crank arm 297. The top of the crank arm is pinned at 299 to a link 301 which in turn is pinned at 303 to the plunger 305 of a solenoid 307. A spring 309 tends to urge the crank 297 in a counterclockwise direction. An adjustment screw 311 in a block 313 on the side of the block 293 bears upon the crank 297 to limit the amount of its clockwise movement, thus limiting the point to which the bending surface 287 can be moved upwardly and the angle to which the ear 80 will be bent. It may be noted that the inside face of the barrier 248 is relieved at 315 to receive the ear 80 and the bending element 285, the adjacent inside surface of the barrier serving to locate the contacts 60 in proper position on the lower electrode.

The solenoid 307 is operated by a micro switch 317 that may be mounted on the bracket 13 and which carries suitable contact members 319 that can be operated by a pin 321 adjustably carried by the arm 323 of a bracket 325 which is bolted to the slide 35. When the slide moves down the micro switch 317 will be actuated to energize the solenoid to cause a bending operation by the member 285 and when the slide 35 is retracted the micro switch will de-energize to lower the member 285.

The operation of the various parts of the present machine has been indicated in the above description. A cycle of operation is initiated by the operator, after she has inserted a wire 65 in the tubular socket 61 through the barrier opening 261, by tripping a foot switch 350 (Fig. 22). This energizes the welding controls generally indicated at 351 and which are a part of the welding apparatus and ordinarily supplied with it. The weld controls or timer 351 receives current through the lines 353 and this may be reduced in voltage by a transformer 355 for the control circuit including lead lines 357 and 358. The operation and control of the various elements are diagrammatically indicated in simplified form in Fig. 22 and for this purpose the timer 351 is shown as including a relay 359 that controls operation of switches 361, 363, and 365 all of which are normally open. When the relay 359 is energized by closing of switch 350, these three switches will close to energize their respective circuits 367, 369, and 371. These circuits contain, respectively, solenoids 373, 32, and 375 which control operation of electrode 265, slide 35, and air jet 247 so that when the circuits are closed the electrode 265 and the slide 35 move down and the air jet 247 is turned on. After a predetermined weld period has passed the control apparatus 351 will de-energize relay 359 and open up the various circuits 367, 369, and 371. The barrier solenoid 273 is under the control of the limit switch 271 in circuit 379 and it may incorporate a time delay so that shortly after the barrier has been lowered, giving time for the operator to remove the welded contact 60, the solenoid 273 will be de-energized allowing the spring 377 to return the barrier to its up or blocking position. If desired, the operation of solenoid 273 can also be tied in to the control 351 so that the barrier will be automatically lowered when the electrode 265 is lifted by energizing of the solenoid 373. The solenoid 307 in circuit 381 is controlled by the limit switch 317 which is operated by the pin 321 on slide 35. The valve element 383 in the circuit 25 may also be regulated to vary the rate of air flow to the pressure cylinder 23 and thus control the rate of movement of the cutoff punch. As already indicated, the air jets 231 and 233 along with the orifice 235 may be connected by conduits (not shown) to the exhaust of the control valve 30 and will thus supply air jets when the punch 181 is retracted after severing a contact 60. Alternatively, these jets or certain of them, may be connected to a constant source of air pressure so as to always supply air tending to blow the contacts down the chute 221. The control circuit 351 is such that the ram 27 is retracted when the limit switch 363 is de-energized. These various controls are standard items and well known to electricians in the industrial machinery field and for the most part it is necessary only to follow directions furnished by the manufacturer of the welding apparatus or the air cylinder assembly 23 and 25 in order to have a proper electrical and pneumatic hookup.

While the invention has been shown in connection with a certain particular workpiece, it will be appreciated that it can be easily adapted to other types of workpieces and that various other changes can be made in the structure shown herein without departing from the spirit and scope of the invention.

I claim:

1. In a cutoff and weld apparatus of the type described, a feed track to receive a strip of interconnected parts, a reciprocating pawl adjacent said feed track to index the strip along said track, a rack bar connected to said feed pawl and driven by a gear, a reciprocating slide carrying a punch for severing a part from said strip, said slide carrying a rack driving said gear, a weld station spaced from said cutoff punch, a gravity slide chute for transferring parts from the punch to the weld station, a movable barrier at the bottom of the chute for properly locating the part at the weld station, a bending member adjacent said barrier at said weld station for staking a portion of the part on a wire inserted in the part through the barrier and welded thereto, a limit switch controlling operation of the bending element, means on the slide controlling operation of the limit switch, and means synchronizing operation of the weld means and the cutoff punch so that they operate substantially together.

2. The invention set forth in claim 1 including air pressure jets arranged to blow the part down the chute and to hold it in proper position for welding.

3. In a cutoff and weld apparatus for receiving a strip of interconnected parts, a cutoff mechanism, means for feeding a strip of parts to said cutoff mechanism, weld mechanism including a lower fixed electrode and an upper movable electrode, said lower electrode being positioned below said cutoff mechanism, an inclined chute connecting said cutoff mechanism with said lower electrode whereby parts severed from the strip will move down the chute to said electrode, a movable barrier at the bottom of said chute to limit movement of the part down the chute, solenoid means connected to the barrier and operative to move it out of blocking position, and limit switch means controlling said solenoid means and operated upon slight movement of the barrier to energize the solenoid means.

4. In a weld apparatus of the type described, a fixed lower electrode and a movable upper electrode, a slide chute for feeding parts to said lower electrode, said slide chute having a cut out portion at the bottom thereof in which said lower electrode is located, said feed chute having a support surface for a part located at the bottom thereof and spaced laterally from the lower electrode, a movable barrier at the bottom of said chute, and power means operated by a manual pull on the barrier for moving said barrier out of blocking position at the end of the chute whereby said part can be removed from said lower electrode.

References Cited in the file of this patent

UNITED STATES PATENTS

| | | |
|---|---|---|
| 2,024,597 | Pfeiffer | Dec. 17, 1935 |
| 2,078,694 | Smith | Apr. 27, 1937 |
| 2,210,062 | Campbell | Aug. 6, 1940 |
| 2,494,137 | Martines | Jan. 10, 1950 |
| 2,631,213 | Martines | Mar. 10, 1953 |
| 2,684,421 | Hipple | July 20, 1954 |
| 2,684,423 | Hipple | July 20, 1954 |
| 2,708,968 | Soave | May 24, 1955 |